United States Patent [19]
Takeura

[11] Patent Number: 5,805,390
[45] Date of Patent: Sep. 8, 1998

[54] METHOD OF FABRICATING MAGNETORESISTIVE EFFECT TYPE MAGNETIC HEAD CAPABLE OF PREVENTING ELECTROSTATIC DAMAGE

[75] Inventor: Tooru Takeura, Kanagawa-ken, Japan

[73] Assignee: Hitachi, Ltd., Tokyo, Japan

[21] Appl. No.: 718,127

[22] Filed: Sep. 18, 1996

[30] Foreign Application Priority Data

Sep. 19, 1995 [JP] Japan .................................. 7-239941

[51] Int. Cl.$^6$ .............................. G11B 5/39; H01L 21/28
[52] U.S. Cl. ..................... 360/113; 29/603.14; 29/603.16
[58] Field of Search ................... 360/113, 128, 360/126; 338/32 R; 29/603.16, 603.18, 603.12, 603, 13, 603.14, 603.15

[56] References Cited

U.S. PATENT DOCUMENTS

| | | | |
|---|---|---|---|
| 4,317,149 | 2/1982 | Elser et al. | 360/126 |
| 4,800,454 | 1/1989 | Schwarz et al. | 360/103 |
| 5,065,094 | 11/1991 | Mowry | 360/113 |
| 5,465,186 | 11/1995 | Bajorek et al. | 360/113 |
| 5,491,605 | 2/1996 | Hughbanks et al. | 360/113 |
| 5,559,051 | 9/1996 | Voldman et al. | 29/603.12 |
| 5,638,237 | 6/1997 | Phipps et al. | 360/113 |

FOREIGN PATENT DOCUMENTS

61-77114  4/1986  Japan .

*Primary Examiner*—Stuart S. Levy
*Assistant Examiner*—Kevin M. Watkins
*Attorney, Agent, or Firm*—Kenyon & Kenyon

[57] ABSTRACT

A novel magtnetoresistive head unit includes an upper shield film and a lower shield film electrically connected to electrodes connected with an external source which are shorted by a shorting circuit without the intermediary of an MR element. The current due to static electricity generated in the process of element formation is made to flow through the shorting circuit thereby to prevent the electrostatic breakdown of the MR element and the dielectric breakdown between the MR element and the shield films. After cutting out a slider from the substrate, the upper and lower shield films are shorted by the shorting circuit, thereby preventing the electrostatic breakdown of the magnetoresistive element and the dielectric breakdown between the magnetoresistive element and the shield films during the assembly and transportation. The electrostatic breakdown is also prevented in the processes from the formation of the magnetoresistive (MR) element to the mounting of the MR element on the apparatus, thereby making it possible to fabricate an MR head and a write-read separated magnetic head with a high yield.

6 Claims, 9 Drawing Sheets

PRIOR ART
FIG.6A
INITIAL SUBSTRATE WITH A MULTIPLICITY OF ELEMENTS FORMED

PRIOR ART
FIG.6B
SLIDER

EQUIVALENT CIRCUIT BEFORE CUTTING SUBSTRATE

FIG.11B

EQUIVALENT CIRCUIT AFTER CUTTING SUBSTRATE

PRIOR ART

FIG.12

PRIOR ART

METHOD OF FABRICATING MAGNETORESISTIVE EFFECT TYPE MAGNETIC HEAD CAPABLE OF PREVENTING ELECTROSTATIC DAMAGE

BACKGROUND OF THE INVENTION

The present invention relates to a magnetoresistive magnetic head and a method of fabricating the same used for a magnetic disk apparatus or the like, or in particular to a magnetoresistive magnetic head and a method of fabricating the same capable of preventing the electrostatic breakdown of a magnetoresistive element.

Generally, a magnetoresistive magnetic head (hereinafter referred to as "the MR head") using a magnetoresistive element utilizes the change of the electric resistance characteristic of the magnetoresistive film in accordance with the magnetic field generated by a magnetic recording medium. The reproduction output, therefore, has a high reproduction sensitivity regardless of the relative speed between the head and the magnetic recording medium. As a result, the MR head is very advantageously used for increasing the density and reducing the size of the magnetic disk apparatus or the magnetic tape apparatus. In view of this, vigorous efforts are being made to develop a write-read separated magnetic head comprising a combination of a read-only MR head and a recording inductive thin-film magnetic head.

Figure 12:
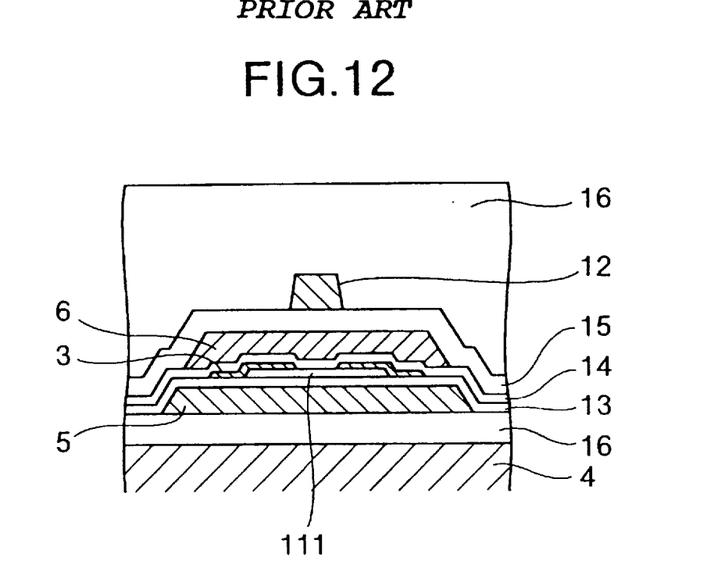
FIG. 12 is a circuit diagram showing an equivalent circuit of a conventional magnetoresistive head.
Figure 13:
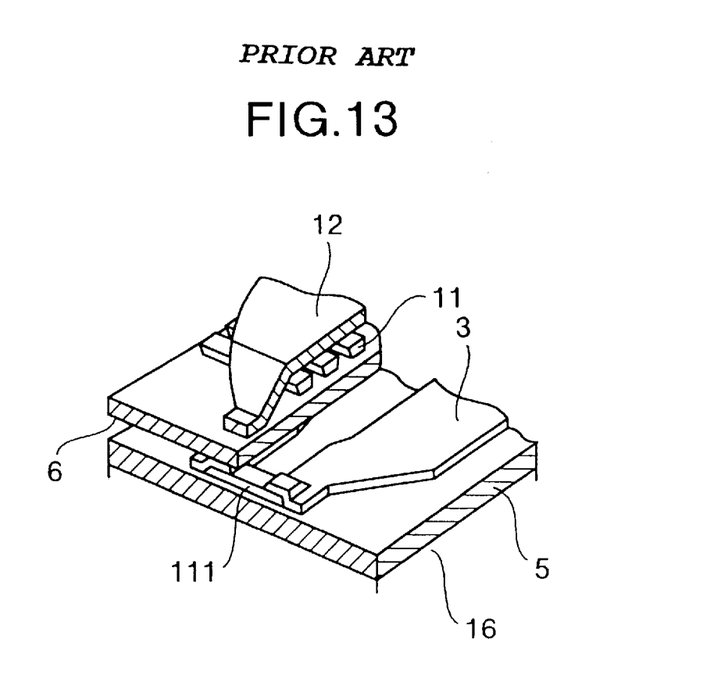
FIG. 13 is a perspective view showing a write-read separated composite head according to the prior art.

The conventional write-read separated magnetic head unit will be described with reference to FIG. 12 and FIG. 13. FIG. 12 shows a write-read separated magnetic head as viewed from a medium in opposed relation to the head, and FIG. 13 is a perspective view of the write-read separated magnetic head. The conventional write-read separated magnetic head shown in FIGS. 12 and 13 has such a structure that a reproduction MR head and a recording magnetic head of inductive thin film type are deposited on an insulating layer of alumina or the like. The reproduction MR head, as shown in FIGS. 12 and 13, includes an upper shield film 6, a lower shield film 5, an MR element 111 having a magentoresistive film (hereinafter referred to as "the MR film") and a bias film, electrodes 3, 3' formed at the ends of the MR element 111, a lower gap film 13 and an upper gap film 14 arranged between the shield films 5, 6. Each film constituting this MR head is very thin. The MR film, for example, has a thickness of several tens of nm, and the lower gap film 13 and the upper gap film 14 are about 100 to 300 nm thick. These film thicknesses tend to become even smaller with the increased density. The recording magnetic head of inductive thin film type, on the other hand, includes a magnetic coil 11 wound between an upper core 12 and the upper shield film 6 and a terminal not shown. The thickness of the films of the recording magnetic head also tends to decrease with the increase in density. In FIGS. 12 and 13, numeral 4 designates a substrate, and numeral 16 an insulating layer of alumina or the like for holding each head.

Figure 6A:
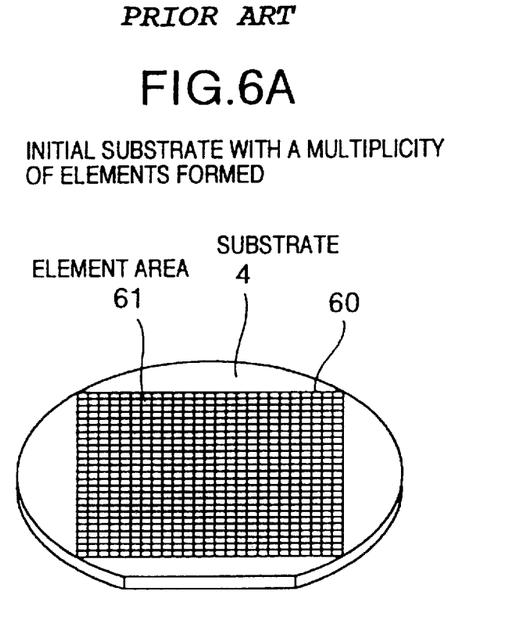
FIG. 6A is an enlarged view showing a magnetic head element formed on a substrate.

In fabricating the write-read separated magnetic head, as shown in FIG. 6A, a multiplicity of magnetic head elements 60 formed on the disk-shaped substrate 4 (the magnetic head elements as formed on the substrate are hereinafter referred to as "the head elements") are cut and ground for each element area thereby to separate and process them one by one. In this way, a slider 100 (FIG. 6B) floated by a viscous air flow over the disk is fabricated.

A great problem in fabricating a write-read separated magnetic head with the reproduction MR head or the recording inductive thin-film magnetic head deposited thereon is that the MR head element is liable to electrostatically break down. This is due to the fact that the films constituting the MR head are very thin. The electrostatic breakdown of the MR head is described, for example, in JP-A-61-77114. In this publication, a method for preventing the breakdown of the MR element is disclosed, in which a pair of shields holding electrodes therebetween are connected at an equal potential and the potential difference thus is eliminated between the shields thereby to prevent discharge and breakdown of the MR element. The intention incorporated in this structure is that the static charge generated when the MR head is running on a medium such as a magnetic disk is prevented from being stored on the MR element or on the shield films and the stored charge is prevented from discharging between the MR element and the shields thereby to cause a dielectric breakdown between the MR element and the shields. This method is considered effective to prevent the electrostatic breakdown of a head in use leading to an operating error or destruction of information recorded on the medium while the magnetic disk medium is running.

The above-mentioned conventional write-read separated magnetic head, however, fails to take into consideration the electrostatic breakdown which occurs during the fabrication of the head element or the processing or assemblage of the head. In spite of the conventional method, therefore, the electrostatic breakdown of the MR element often occurs inconveniently during the fabrication or other processes of the magnetic head unit. The electrostatic breakdown of the MR element which occurs during the fabrication of the head element will be described with reference to FIG. 7.

Figure 7:
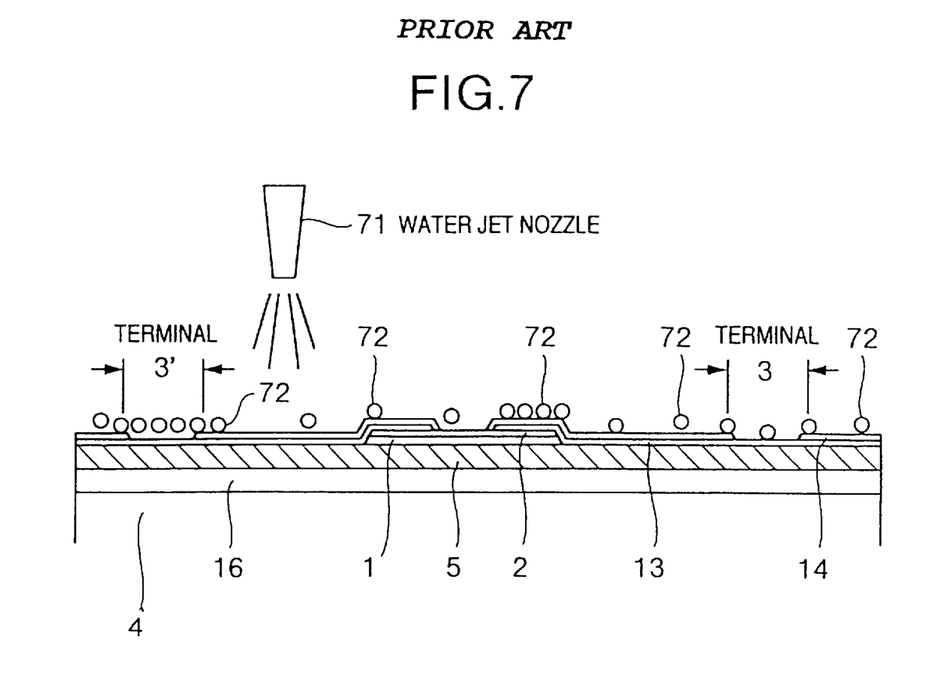
FIG. 7 is a diagram for explaining the charge distribution leading to electrostatic breakdown.

FIG. 7 is a schematic diagram for explaining the manner in which the MR elements in the process of being formed on the substrate 4 shown in FIG. 6A are charged while being washed by water jet. FIG. 7 shows the process in which the insulating layer 16 and the lower gap film 13 are formed on the substrate 4, the upper gap film 14 is formed on the lower gap film 13 by dry etching using the photolithography and the ion milling techniques, through holes are formed at the terminals of the electrodes 3, 3', and foreign matters and dust are removed using the water jet in the washing step after separation of photoresist. In this process, the high-pressure water blown out of a water jet nozzle 71 rotates at high speed relatively with the substrate 4 on which the MR elements are formed. Therefore, the friction between the surface of the substrate 4 and the water generates charges 72, so that a multiplicity of charges 72 stay on the surface of each MR element. In this way, the charges 72 are stored over the entire MR element through the terminals of the electrodes 3, 3'.

After this process, assume that the electrode 3 or the electrode 3' is grounded in order to measure the static characteristics of the MR element. The charges 72 stored in the MR element are discharged outside. At the same time, a large current flows from the electrode 3 or the electrode 3' not grounded to the earth through the MR film, thereby inconveniently increasing the resistance due to the heating and breakdown of the MR film and the diffusion with the bias film.

Even after the through holes are formed in the terminals of the electrodes 3, 3', many washing steps are required following photoresist separation using the photolithography, for washing off foreign matters and dust by water jet, which is liable to cause such a phenomenon as the melting or an increased resistance of the MR film. A similar method is employed for washing off foreign matter and dust during and after the step of cutting the substrate 4, which is also liable to cause the melting or an increased resistance of the MR film. Also, while the MR elements are transported or stored during the forming, processing or assemblage, the atmospheric charge is stored on each MR element and the MR head. In the case where the terminal of the electrode 3 or the electrode 3' is grounded, the large current described above flows in the MR film, thereby often causing an increased resistance or the melting of the MR film.

SUMMARY OF THE INVENTION

An object of the present invention is to eliminate the above-mentioned problems of the prior art and to provide a magnetoresistive head and a method of fabricating the same capable of preventing the electrostatic breakdown of the magnetoresistive element or the like also during the fabrication and transportation.

Another object of the invention is to provide a magnetoresistive head unit and a method of fabricating the same with high yield while preventing the electrostatic breakdown in the process before mounting on the magnetic disk apparatus or the like.

In order to achieve the above-mentioned objects, according to a first aspect of the present invention, there is provided a magnetoresistive head comprising a magnetoresistive element including a magnetoresistive film and a bias film, a pair of electrodes for detecting the resistance change of the magnetoresistive element due to the change of an external magnetic field, an upper shield film and a lower shield film for holding the magnetoresistive element and the two electrodes therebetween, and a shorting circuit for shorting the two electrodes without the intermediary of the magnetoresistive element.

According to a second aspect of the invention, there is provided a magnetoresistive magnetic head comprising a magnetoresistive element including a magnetoresistive film and a bias film, a pair of electrodes for detecting the resistance change of the magnetoresistive element due to the change of an external magnetic field, an upper shield film and a lower shield film for holding the magnetoresistive element and the two electrodes therebetween, and a shorting circuit for electrically shorting the upper shield film and the lower shield film without the intermediary of the magnetoresistive element, wherein one of the electrodes is electrically connected to the upper shield film, and the other electrode is electrically connected to the lower shield film.

According to a third aspect of the invention, there is provided a magnetoresistive head having the features of the first and second aspects described above, wherein the resistance value of the shorting circuit is not more than one tenth that of the magnetoresistive element.

According to a fourth aspect of the invention, there is provided a method of fabricating a magnetoresistive head comprising a magnetoresistive element including a magnetoresistive film and a bias film, a pair of electrodes for detecting the resistance change of the magnetoresistive element due to the change of an external magnetic field, an upper shield film and a lower shield film for holding the magnetoresistive element and the two electrodes therebetween, and a shorting circuit for shorting the two electrodes without the intermediary of the magnetoresistive element, wherein the magnetoresistive element and the magnetic head are assembled with the two electrodes being shorted by the shorting circuit to each other without the intermediary of the magnetoresistive element.

According to a fifth aspect of the invention, there is provided a method of fabricating a magnetoresistive head comprising a magnetoresistive element including a magnetoresistive film and a bias film, a pair of electrodes for detecting the resistance change of the magnetoresistive element due to the change of an external magnetic field, an upper shield film and a lower shield film for holding the magnetoresistive element and the two electrodes therebetween, and a shorting circuit for electrically shorting the upper shield film and the lower shield film without the intermediary of the magnetoresistive element, wherein one of the electrodes is electrically connected to the upper shield film and the other electrode is electrically connected to the lower shield film, the magnetoresistive element and the magnetic head being assembled with the two electrodes being shorted by the shorting circuit without the intermediary of the magnetoresistive element.

According to a sixth aspect of the invention, there is provided a method of fabricating a magnetoresistive head having the features of the fourth and fifth aspects described above, wherein the resistance value of the shorting circuit is not more than one tenth that of the magnetoresistive element.

In the magnetoresistive head according to the first aspect, the shorting circuit is provided for shorting the two electrodes without the intermediary of the magnetoresistive element thereby to prevent the electrostatic breakdown of the magnetoresistive element which otherwise might be caused by the static electricity generated during the processes of forming, assembling or transporting the element.

In the magnetoresistive head according to the second aspect, the shorting circuit is provided for shorting, without the intermediary of the magnetoresistive element, the upper shield film and the lower shield film electrically connected to the electrodes thereby to prevent the electrostatic breakdown of the magnetoresistive element and the dielectric breakdown between the magnetoresistive element and the two shield films which otherwise might be caused during the processes of forming, assembling or transporting the element.

In the magnetoresistive head according to the third aspect, the resistance value of the shorting circuit constituting the features of the first and second aspects is reduced to one tenth or less the resistance value of the magnetoresistive element, so that the electrostatic charge flows mainly through the shorting circuit thereby to prevent the electrostatic breakdown of the magnetoresistive element and the dielectric breakdown between the magnetoresistive element and the upper and lower shield films.

In the method of fabricating a magnetoresistive head according to the fourth aspect, the shorting circuit is provided for shorting the electrodes without the intermediary of the magnetoresistive element, the magnetoresistive element is formed and the magnetic head is assembled with the electrodes being shorted by the shorting circuit without the intermediary of the magnetoresistive element thereby to prevent the electrostatic breakdown of the magnetoresistive element during the processes of forming, assembling or transporting the element.

In the method of fabricating the magnetoresistive head according to the fifth aspect, the shorting circuit is provided for shorting, without the intermediary of the magnetoresistive element, the upper and lower shield films electrically connected to the electrodes thereby to prevent the electrostatic breakdown of the magnetoresistive element and the dielectric breakdown between the magnetoresistive element and the two shield films.

In the method of fabricating the magnetoresistive head according to the sixth aspect, wherein the resistance value of the shorting circuit based on the features of the fourth and fifth aspects is set to one tenth and less the resistance value of the magnetoresistive element, so that the charged static electricity flows mainly through the shorting circuit thereby to prevent the electrostatic breakdown of the magnetoresistive element and the dielectric breakdown between the magnetoresistive element and the two shield films.

DESCRIPTION OF THE PREFERRED EMBODIMENTS

A magnetoresistive head and a method of fabricating it according to an embodiment of the present invention will be described below with reference to the accompanying drawings.

First, the principle of the invention will be described with reference to FIGS. 11A and 11B.
[Explanation of principle]

Figure 11A:
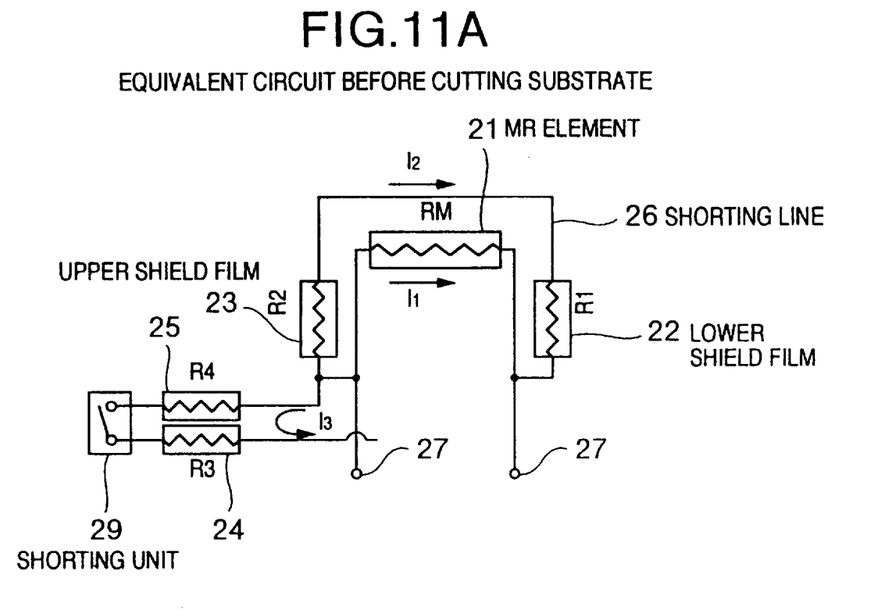
FIG. 11A is a circuit diagram showing an equivalent circuit of a magnetoresistive head before the substrate is cut according to the present invention.
Figure 11B:
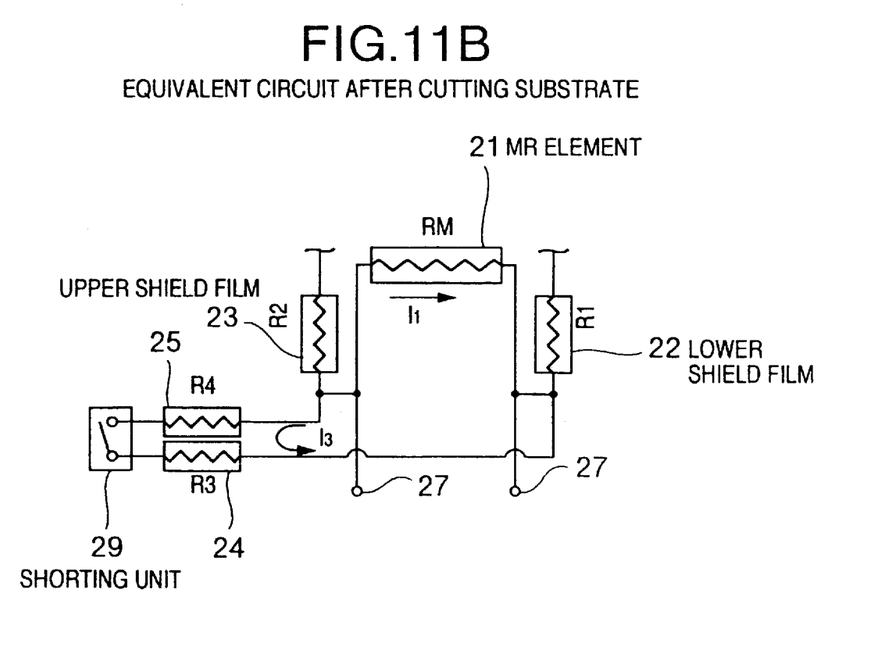
FIG. 11B is a circuit diagram showing an equivalent circuit of a magnetoresistive head after the substrate is cut.

FIG. 11A shows an equivalent circuit of a magnetoresistive head element (hereinafter referred to as the "MR head element") before the substrate thereof is cut in the fabrication process, and FIG. 11B shows an equivalent circuit after the substrate thereof is cut.

The equivalent circuit of the MR head element and the peripheral circuits of the magnetoresistive head according to the present invention is so configured that, as shown in FIG. 11A, the ends of an MR element 21 are connected to one end each of an upper shield film 23 and a lower shield film 22 respectively, and the other ends of the upper shield film 23 and the lower shield film 22 are connected to each other through a shorting line 26. The MR element 21 includes an MR film and a bias film for applying a bias to the MR film. The MR film and the bias film each have a thickness of several tens of nm, a track width of several to several tens of $\mu$m, and an MR height of several $\mu$m. The resistance RM of this portion is several tens of ohm. The upper shield film 23 and the lower shield film 22 are made of an NiFe permalloy having a thickness of about several $\mu$m and is substantially square in shape. Therefore, the resistance values R2 and R1 of the respective shield films are 1 $\Omega$ or less.

In the MR head element and the peripheral circuits according to the invention, as described above, the upper shield film 23 and the lower shield film 22 are connected through the shorting line 26. Even when a current due to static electricity flows between the MR terminals 27, therefore, the charge stored in and in the neighborhood of the electrode pair of the MR head element 21 flows as a current $I_2$ through the shorting line 26 between the upper shield film 23 and the lower shield film 22. The current $I_1$ flowing in the MR element 21 (magnetically sensitive part) is very small. As a result, the electrostatic breakdown of the MR element can be prevented in the process before cutting the substrate. It is also possible to prevent the dielectric breakdown between the shield films 22, 23 and the MR element 21 due to the potential difference therebetween, since each electrode of the MR element 21 is connected to the shields 22 and 23 so that the potential difference is reduced to zero between the shields and the MR element.

FIG. 11B shows an equivalent circuit of the MR head element and the peripheral circuits after the substrate is cut. From the state shown in FIG. 11A, the shorting line 26 is disconnected and the ends of the MR element 21 are connected to one end each of the upper shield film 23 and the lower shield film 22, respectively. The MR element and the upper and lower shield films are also adapted to be connected to each other by a shorting circuit 29 through a resistor 25 formed of a multiplicity of interconnected films and a resistor 24 formed of a multiplicity of interconnected films. In this circuit, the upper shield film 23 and the lower shield film 22 are made of the same material of the same thickness. The portions of the films 22, 23 adapted to be extended 1 have a width of about several tens of $\mu$m and a length of about several hundred $\mu$m to set the resistances R1, R3 to about several ohms.

In the MR head element and the peripheral circuits according to the invention, as described above, the shorting line 26 is disconnected and the interconnected ends of the upper shield film and the lower shield film on the substrate are connected by the shorting circuit 29. Even when a current due to static electricity flows between the MR terminals 27, therefore, the charge stored in and in the neighborhood of the electrode pair of the MR head element 21 flows as a current $I_3$ through the resistor 25 formed of the upper shield film, etc. and the resistor 24 formed of the lower shield film, etc. The current $I_1$ flowing in the MR element 21 (magnetically sensitive part) can be reduced to a very small amount. Strictly speaking, the current $I_1$ flows by an amount corresponding to the ratio of resistance between the MR element 21 (magnetically sensitive part) and the extended portion. Since the resistance value of the extended portion is one tenth or less the resistance value of the magnetically sensitive part, however, the current $I_1$ can substantially be ignored. Further, the dielectric breakdown which otherwise might occur due to the potential difference between the shield films and the MR element can be prevented in similar fashion.

As described above, in fabricating the magnetoresistive head according to this invention, the lower and upper shield films are shorted to each other before cutting the substrate thereby to prevent a great amount of the unrequired charge from flowing in the MR element 21. After cutting the substrate, on the other hand, the lower and upper shield films of a plurality of magnetic head elements are connected and shorted, thus similarly preventing the unrequired charge from flowing in a great amount in the MR element 21. If means for connection between the upper shield film and the lower shield film is left unremoved after completion of the head, however, the only reproduction output detection current that flows is the part of the current flowing in the MR element. The connection means, therefore, is required to be formed in such a position as to be removed during the fabrication process. Also, after cutting the connection means between the upper shield film and the lower shield film, or specifically, in the steps of processing the slider and mounting the suspension or otherwise assembling the head unit, the element is structured to expose a part of the upper shield film and a part of the lower shield film. It is necessary to conduct the subsequent processing and assembling work while connecting the particular parts and configuring a protective circuit by the two shield films. This process will be described more specifically below.

[Example 1 of preventing electrostatic breakdown in forming MR element]

A magnetoresistive head and a method of fabricating the same based on the above-mentioned principle according to an embodiment will be described in detail below with reference to the drawings.

Figure 1:
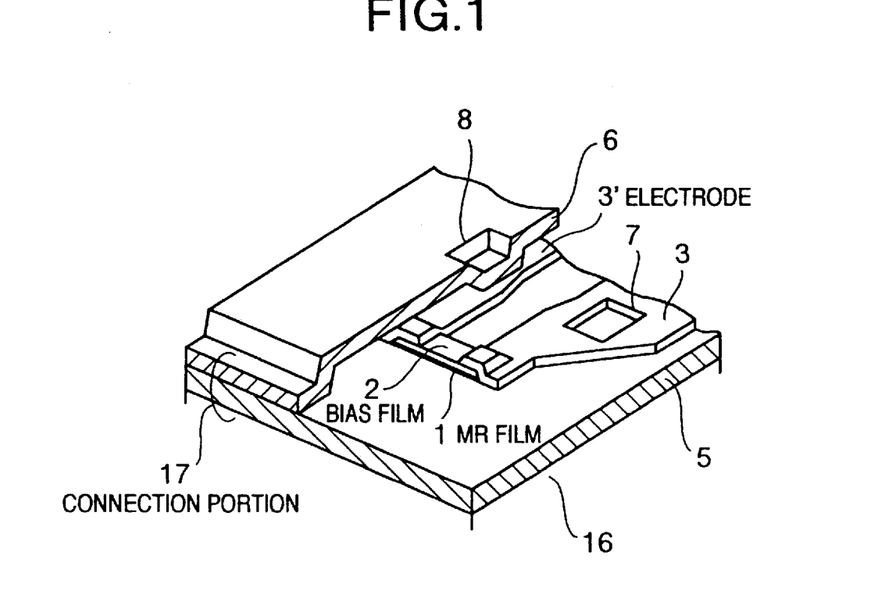
FIG. 1 is a perspective view showing a magnetoresistive head according to an embodiment of the invention.
Figure 5A:
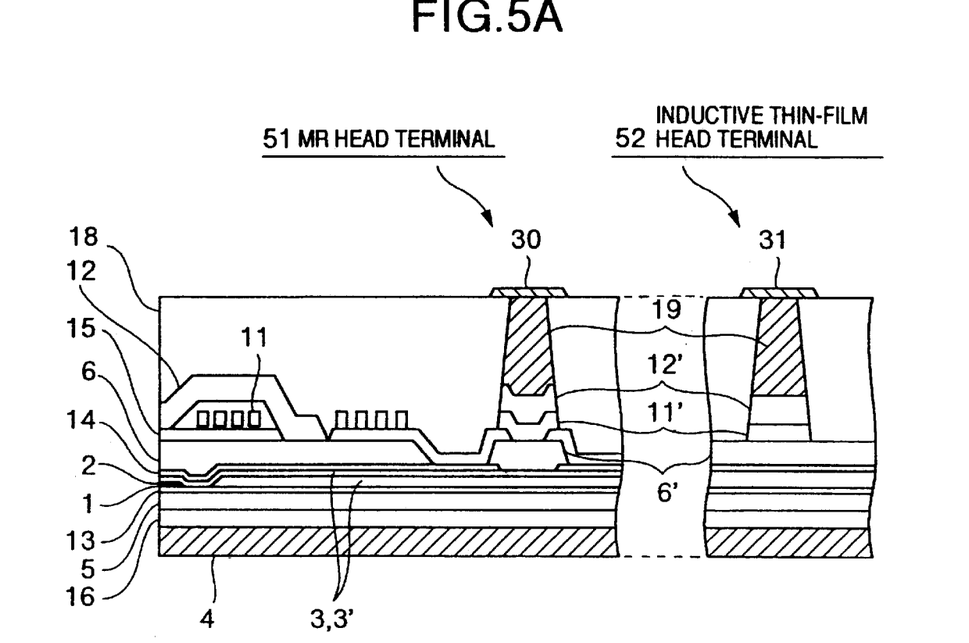
FIGS. 5A, 5B, 5C are sectional views showing a write-read separated magnetic head according to an embodiment of the invention.
Figure 5B:
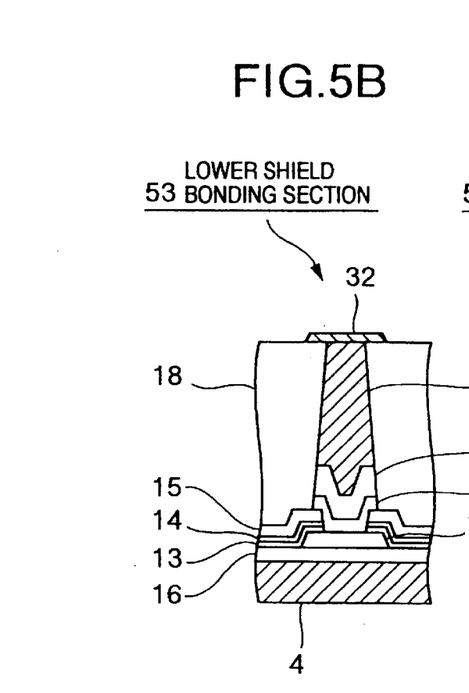
Figure 5C:
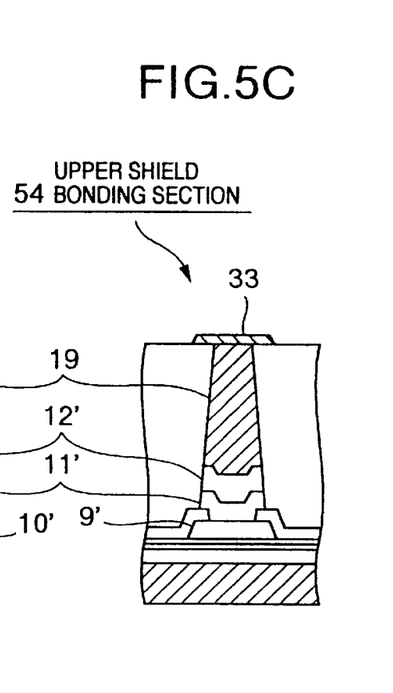

FIG. 1 is an enlarged perspective view showing a magnetoresistive head (MR head) according to an embodiment of the invention. FIGS. 5A to 5C are sectional views of the MR head shown in FIG. 1. In the MR head according to this embodiment, as shown in FIG. 1, an end of the upper shield film 6 is bent and connected to an end of the lower shield film 5 thereby to form a connection portion 17 in the circuit on the substrate before being cut in the fabrication process. A shorting circuit 26 shown in FIG. 11 is thus formed. Even when a current due to static electricity flows between the MR terminals, the charge stored in and in the vicinity of the MR element and the electrodes 3, 3' flows through the connection portion 17 of the upper and lower shield films. In this way, the current flowing in the MR film 1 or a shunt bias film 2 is considerably reduced, so that the electrostatic breakdown of the MR element is prevented in the fabrication process before cutting the substrate.

This MR head is structured in multiple layers as shown in FIG. 5A and is fabricated in the steps described below.

(1) An insulating layer 16 of alumina or the like is formed by sputtering on the substrate 4.

(2) The surface of the insulating layer 16 is lapped in order to reduce the roughness thereof, and is then washed by water jet in order to remove the foreign matter and dust left by lapping.

(3) The lower shield film 5 is formed on the insulating layer 16 thus washed. The lower shield film 5 is an NiFe alloy thin film formed by sputtering, and formed into a predetermined shape by the dry etching using the photolithography and ion milling. After removing the photoresist, the lower shield film 5 is washed by water jet to remove foreign matter and dust. The thickness of the lower shield film 5 is 1 $\mu$m.

(4) Next, an insulating film of alumina or the like is formed by sputtering on the lower shield film 5 thereby to form a lower gap film 13. This lower gap film 13 has a thickness of 200 nm.

(5) Further, the MR film 1 providing a magnetically sensitive part of the MR element and a shunt bias film 2 for applying a bias to the MR film 1 are formed on the lower gap film 13. The MR film 1 and the shunt film 2 are formed continuously by sputtering, followed by dry etching using the photolithography and ion milling techniques for setting a predetermined shape with the initial MR height of 4 $\mu$m. After separating the photoresist, the assembly is washed by water jet to remove foreign matter and dust. This MR film 1 is made of an NiFe alloy thin film in the thickness of 25 nm, and the shunt film 2 of an Nb thin film is 30 nm thick.

(6) The MR head according to this embodiment is formed in such a manner that in order to connect electrodes to be formed and the lower shield film 5 already formed, a window 7 (FIG. 1) is formed in the lower gap film 13 by dry etching using the photolithography and ion milling techniques. After separating the photoresist, the assembly is washed by water jet to remove foreign matter and dust.

(7) The next step is to form the electrodes 3, 3' at the ends of the MR element for obtaining the resistance change of the MR element as a voltage change. In forming the electrodes 3, 3', an Au/Nb double-layered thin film is formed by sputtering, and then shaped in a predetermined manner with the distance between the electrodes 3 and 3' set to 8 $\mu$m for determining the track width by dry etching using the photolithography and ion milling techniques. After separating the photoresist, foreign matters and dust are removed by water jetting. The Au/Nb double-layered thin films of the electrodes 3, 3' have the thickness of 100 nm and 5 nm respectively.

(8) The upper gap film 14 is formed by sputtering an insulating film of alumina or the like. The upper gap film 14 includes a window (FIG. 1) formed for connecting the upper shield film 6 to be formed in the next step and the electrode 3' already formed and a connection portion 17 (the shorting circuit of FIG. 1) for connecting the upper shield film 6 and the lower shield film 5 by dry etching using the photolithography and ion milling techniques (at a position to be removed at the time of processing the head). After the photoresist is removed, foreign matters and dust are removed by water jet. The thickness of the upper gap film 14 is the same 200 nm as that of the lower gap film 13.

(9) As the last step, the upper shield film 6 is formed by sputtering. This film is formed into a predetermined shape by dry etching using the photolithography and ion milling techniques. After the photoresist is separated, foreign matters and dust are removed by water jet. The upper shield film 6 is an NiFe alloy thin film like the lower shield film 5 and has a thickness of 1 $\mu$m.

(10) The magnetoresistive head unit according to this embodiment is fabricated in such a manner that the MR element is prepared by the steps described above. The resistance of each part of the MR element thus completed is such that the magnetically sensitive part at the forward end of the MR element has a resistance of about 11 $\Omega$, and the component parts including the electrode 3 through the lower shield film 5, the connection portion 17, the upper shield film 6 to the electrode 3' has a resistance of about 0.4 $\Omega$, or about $\frac{1}{27}$ that of the magnetically sensitive part.

As described above, the magnetoresistive head unit according to this embodiment comprising the connection portion for shorting the ends of the upper and lower shield films is so configured as to prevent the electrostatic breakdown of the MR element in the fabrication process before the substrate is cut.

[Example 1 of preventing electrostatic breakdown of inductive thin film element in the fabrication process]

Figure 2:
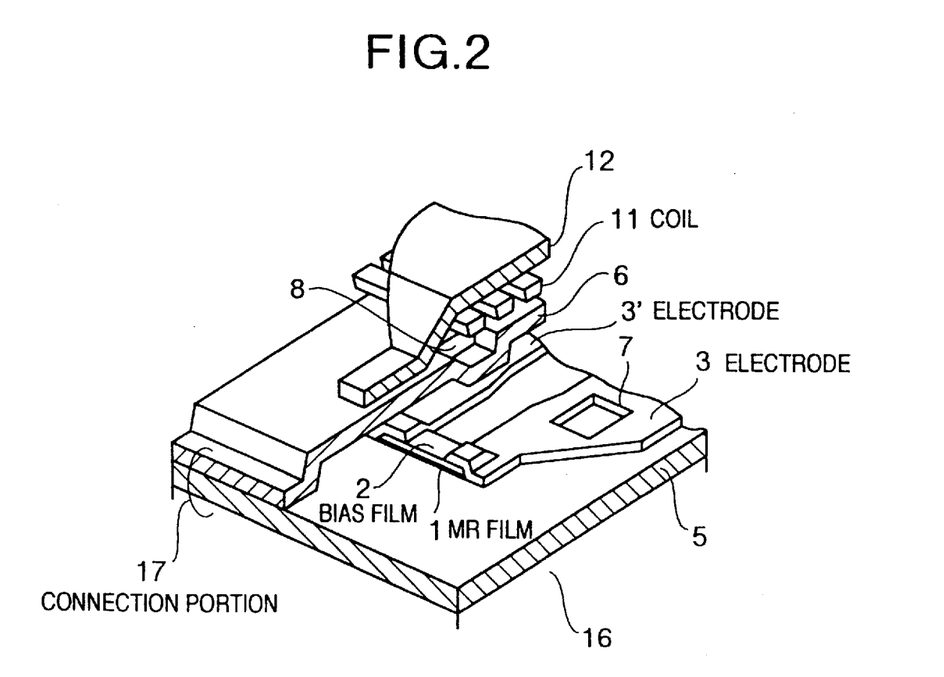
FIG. 2 is a perspective view showing a write-read separated magnetic head including the magnetoresistance head unit shown in FIG. 1.

(11) Now, explanation will be made about the process of forming an inductive thin film magnetic head on the MR element. A write-read separated magnetic head unit including an inductive thin film magnetic head formed on the MR element is generally configured as shown in the perspective view of FIG. 2. As seen, a magnetic circuit is formed on the upper shield film 6 and a coil 11 is wound to generate a recording magnetic field, with a recording upper core 12 arranged thereon. This configuration will be described in detail below.

After forming the upper shield film 6 of the magnetoresistive head unit, the recording gap film 15 is formed for generating magnetic fluxes in the magnetic circuit shown in FIG. 5A. This recording gap film 15 is formed by sputtering an insulating film of alumina or the like. A through hole for forming the terminals of the MR head is formed by dry etching using the photolithography and ion milling techniques. After that, the photoresist is removed by water jet to remove foreign matter and dust. The thickness of the recording gap film 15 is 600 nm.

(12) In order to smooth the steps of the window 8 for connecting the electrode 3' and the upper shield film 6, the photoresist is coated and heat-treated to form an insulating layer (not shown) 3 μm thick.

(13) After that, a coil 11 for generating a recording magnetic field is formed by sputtering. After dry etching into a predetermined shape using the photolithography and ion milling techniques, the photoresist is removed and the assembly is washed by water jet to remove foreign matter and dust. The coil 11 is a Cr/Au/Cr three-layered thin film and has a thickness of 1.2 μm.

(14) In order to insulate the coil 11 and the recording upper core 12, the photoresist is applied and heat treated to form an insulating layer (not shown) 5 μm.

(15) A recording upper core 12 is then formed by sputtering. After the core is formed into a predetermined shape by dry etching using the photolithography and ion milling techniques, the photoresist is separated and the assembly is washed by water jet to remove foreign matter and dust therefrom. The recording upper core 12 is an NiFe alloy thin film like the upper shield film 6 and the lower shield film 5 and has a thickness of 1.6 μm.

(16) Now, explanation will be made about the process of forming terminals and a protective film.

First, terminals of the MR head electrodes 3, 3', a terminal 6' of the upper shield film 6 at the ends of the electrodes 3, 3', a terminal 11' of the coil 11 and terminals 12' of the upper core 12 are deposited at positions of the MR head terminal 51 (FIG. 5A) of the magnetoresistive head unit fabricated by the process mentioned above. In similar fashion, the terminal 6' of the upper shield film 6, the terminal 11' of the coil 11 and the terminal 12' of the upper core 12 are deposited at a position of the terminal 52 of the inductive thin-film magnetic head unit of the inductive thin-film magnetic head unit.

In the MR head terminal 51, the lower terminal 19 is formed by plating on the upper core terminal 12'. Also, in the inductive thin-film magnetic head terminal 52, the lower terminal 19 is formed by plating on the upper core terminal 12'. The lower terminal 19 is made of Cu and has a thickness of 50 μm. After that, an alumina film is formed as a protective film 18 by sputtering to the thickness of 60 μm. This process covers the whole surface of the substrate with the protective alumina film 18, and is followed by the lapping for grinding the protective alumina film 18. After that, foreign matter and dust are washed off by water jet thereby to expose the lower terminal 19. Then, the upper terminal 30 for the MR head and the upper terminal 31 for the inductive thin-film magnetic head are formed by plating the Au material to the thickness of 10 μm on the lower terminal 19 thus exposed. As a result of this process, a write-read separated magnetic head element can be fabricated.

The washing by water jetting is repeatedly used in forming the films and elements in the above-mentioned fabrication processes. According to the present embodiment, the write-read separated magnetic head element is formed with the upper shield film 6 and the lower shield film 16 electrically coupled to each other at the forward ends thereof. Even in the case where the static electricity is overcharged due to the washing process, therefore, only a small amount of current flows in the MR element. It is thus possible to prevent the electrostatic breakdown of the MR element and the dielectric breakdown between the MR element and the two shields.

[Example 2 of preventing electrostatic breakdown of MR element being formed]

The above-mentioned embodiment referred to the case in which the electrostatic breakdown of the MR element is prevented by connecting the forward ends (magnetic head gap side) of the upper shield film 6 and the lower shield film 16. The invention is not limited to such a configuration, but other embodiments are also applicable as described below with reference to FIGS. 3 and 4.

Figure 3:
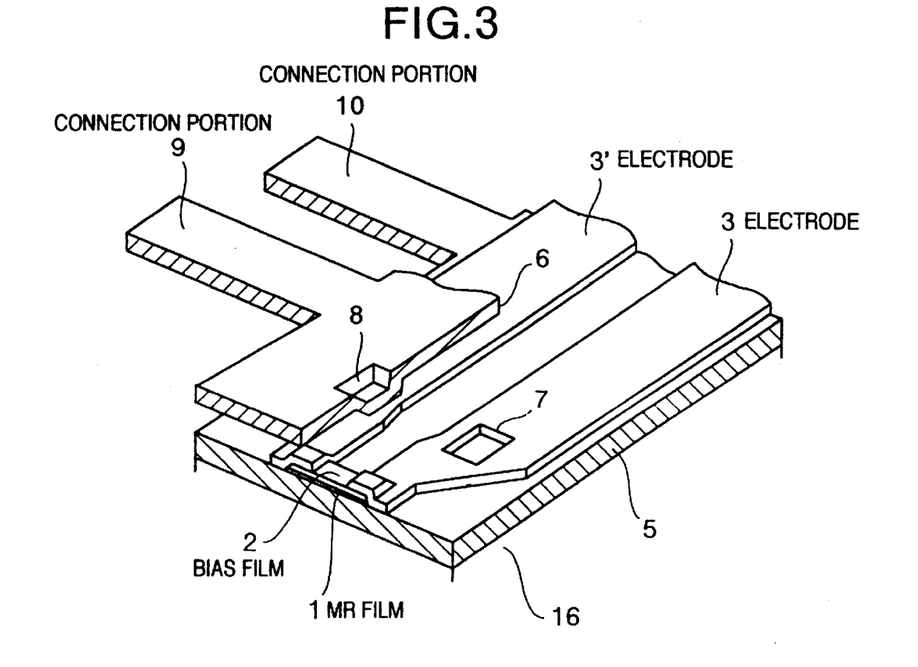
FIG. 3 is a perspective view showing a magnetoresistive head according to a second embodiment of the invention.
Figure 4:
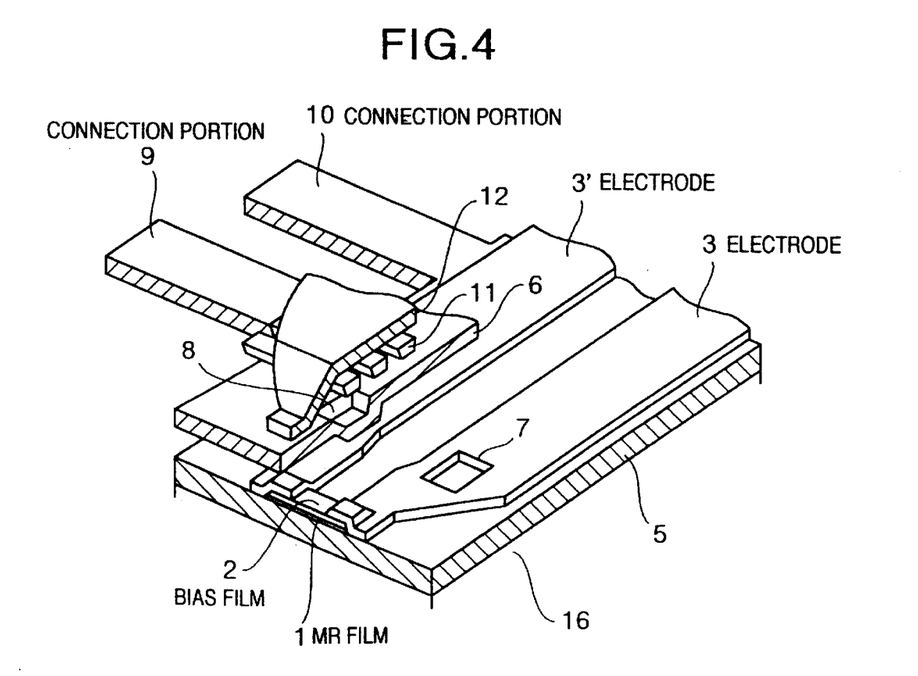
FIG. 4 is a perspective view showing a write-read separated magnetic head including the magnetoresistive head unit shown in FIG. 3.

FIGS. 3 and 4 show the process of forming an MR head element and a write-read separated magnetic head element in the same manner as in the above-mentioned embodiment. In this process of fabricating a magnetic head, however, while the lower shield film 5 is formed during the lapping of a floating surface from the slider process to the assembly, a connection portion 10 (with the extended part having a width at least one fifth the extended length) for forming an MR element protection circuit is formed at the same time to protect the MR element during the period from processing the slider to the complete assembly. Further, when forming the upper shield film 6, the floating surface is lapped. At the same time, during the period from processing the slider to completion of the assembly, a connection portion 9 (with the extended part having a width at least one fifth the extended length) is formed for forming the MR element protection circuit. These connection portion 9 and 10 are shorted to each other in advance.

Furthermore, in the terminal-forming process shown in FIGS. 5B and 5C, the end 11' of the coil 11 of the inductive thin-film magnetic head and the terminal 12' of the recording upper core 12 are deposited on the terminal 9' of the upper shield connection portion 9 and the terminal 10' of the lower shield connection portion 10. After that, the lower terminal 19 is formed by plating on the upper shield connection portion 9 and the lower shield connection portion 10. As in the first embodiment, the protective aluminum film 18 is formed and lapped, followed by exposing the lower terminal 19. Then, the floating surface is lapped. Upper pads 32, 33 for connecting the two shields during the time from slider process to complete assembly are formed by plating in the same thickness as the upper terminal of the inductive thin-film magnetic head and the upper terminal 30 for the MR head.

Also with the magnetoresistive head unit according to the present embodiment, the assembly is washed by water jet with the upper and lower shields shorted to each other. Even when the static electricity is overcharged by washing, therefore, only a small amount of current flows in the MR element, thereby making it possible to prevent the electrostatic breakdown of the MR element and the dielectric breakdown between the MR element and the two shields.

[Example of preventing electrostatic breakdown of substrate in process]

Now, explanation will be made about the prevention of electrostatic breakdown in the steps of processing and assembling the substrate with the MR head element and the write-read separated magnetic head formed thereon in the above-mentioned embodiment.

Figure 8:
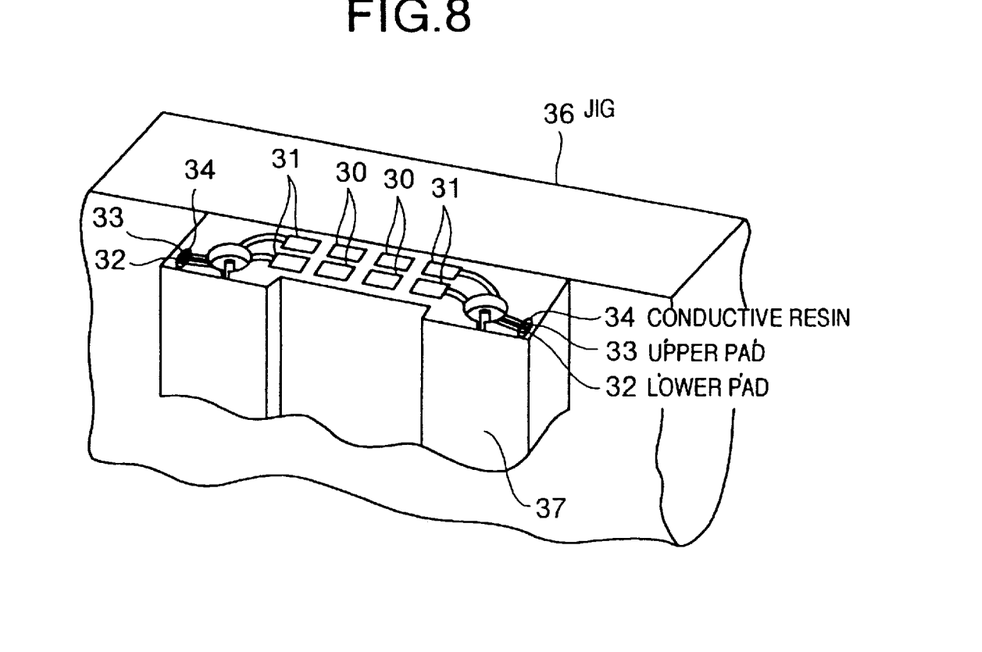
FIG. 8 is a perspective view showing a write-read separated magnetic head in the process of fabrication.
Figure 9:
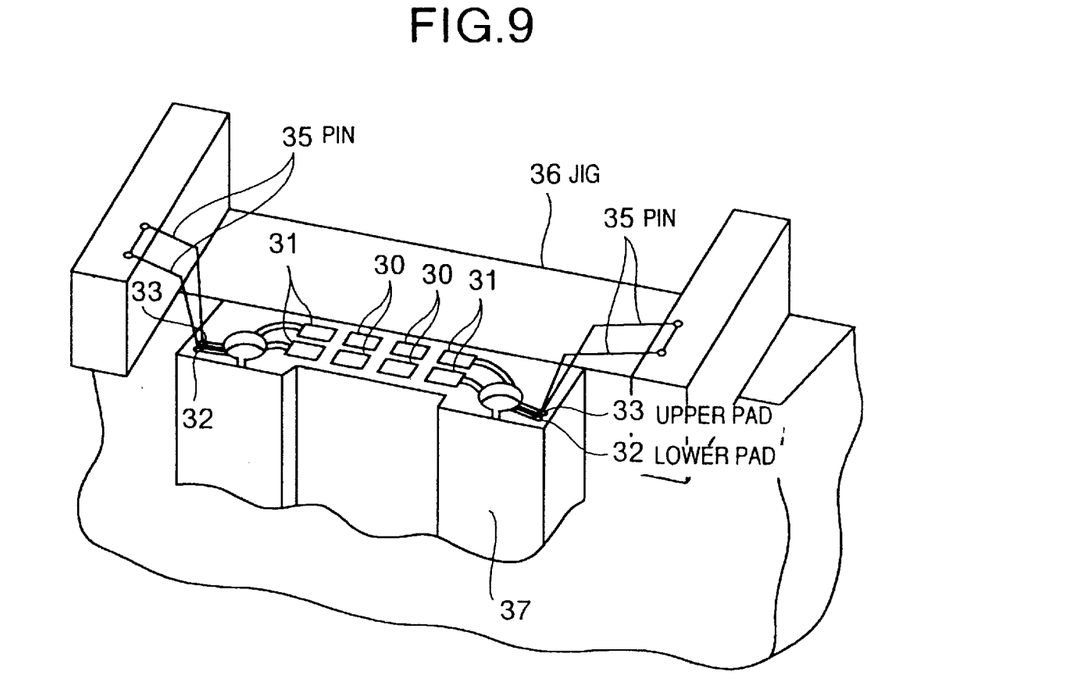
FIG. 9 is a perspective view showing a write-read separated magnetic head in the process of fabrication.

FIGS. 8 and 9 are perspective views for explaining the steps of processing the substrate according to this embodiment. The substrate 4 on which a multiplicity of write-read separated magnetic head elements are formed in the state shown in FIG. 6*a* is cut by machining thereby to form a slider.

FIG. 8 shows the state in which the substrate 4 is cut into blocks of a predetermined size, and after being washed with water jet to remove foreign matter and dust, set in a jig 36.

The magnetic head element according to the present embodiment under this condition has a conductive resin 34 for shorting the upper pad 32 of the upper shield bonding part 53 and the lower pad 33 of the lower shield bonding part 54 shown in FIG. 5B. This conductive resin 34 is composed of copper paste or silver paste, for example. When the protective circuit used for forming the head element is disconnected by cutting off the connection portion 17 of the lower shield film 5 and the upper shield film 6 shown in FIGS. 1 and 2 by lapping the floating surface 37, the conductive resin 34 connects the upper and lower shields thereby to prevent the electrostatic current from flowing in the MR element. In other words, according to this embodiment, a processing and assembly protection circuit replacing the protective circuit used for forming the head element is configured of the conductive resin 34.

Also, as shown in FIG. 9, a machining jig 36 includes pins 35 shorted on the jig 36 side. The pins 35 are connected to the upper pads 32 and 33, so that the upper and lower shield films are connected in the same manner as in the embodiment of FIG. 3, thereby preventing the static electricity from flowing to the MR element. Further, the upper pads 32 and 33 are formed on the side or back of the floating surface 37. At the same time, the machining jig 36 of a conductive material is used so that the upper pads 32, 33 are in direct contact with the jig 36. In this way, the upper and lower shield films are shorted to prevent the electrostatic breakdown without using the pins 35 shorted on the jig 36 side.

Figure 6B:
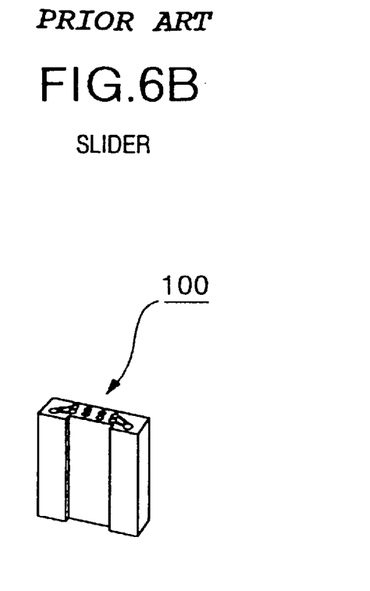
FIG. 6B is a perspective view showing a slider.

In this way, according to this embodiment, when a slider is formed by being cut out from the substrate, a protective circuit for processing/assembly is configured, and the floating surface (slider surface) is lapped thereby to process the MR element to a predetermined height of the MR film. The magnetic head, after reducing the MR film height to 2 $\mu$m, the floating rail and the flow-in end are processed and removed from the machining jig 36, thereby forming a slider as shown in FIG. 6B.

The resistance of the magnetically sensitive part in slider form at the forward end of the MR element produced through the above-mentioned process is about 22 $\Omega$. When the upper pads 32, 33 for connecting the two shields are shorted, the resistance all the way from the electrode 3 through the lower shield connection portion 10 and the upper shield connection portion 9 to the electrode 3' is about 2 $\Omega$ which is only about $\frac{1}{11}$ the value for the magnetically sensitive part.

Also, in the magnetic head according to the present embodiment, the upper pads 32, 33 can be kept shorted through the conductive resin 34 during the transportation to the assembly process or during storage, thereby making it possible to prevent the electrostatic breakdown of the MR element and the dielectric breakdown between the MR element and the two shield films which otherwise might be caused by the friction or the like during transportation.

[Example of preventing electrostatic breakdown during assembly]

With the magnetoresistive head according to this embodiment, the electrostatic breakdown of the MR element or the like can be prevented also in the process of assembling the slider in a load arm (suspension spring) including a gimbal. The assembly steps are described with reference to FIG. 10.

Figure 10:
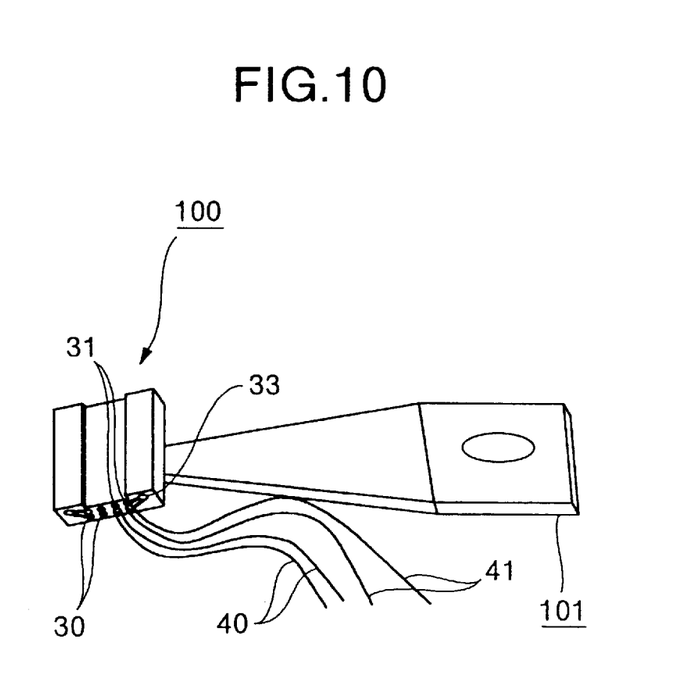
FIG. 10 is a perspective view showing a magnetic head slider after being assembled.

In the magnetoresistive head according to this embodiment, as shown in FIG. 10, during the process of assembling a magnetic head slider 100 in a load arm 101 made up of an elastic material, the upper pads 32, 33 for shorting the upper and lower shield films of the slider 100 are shorted by the conductive resin 34 (FIG. 8). Under this condition, the upper terminal 30 for the MR head and the upper terminal 31 (FIG. 5A) for the inductive thin-film magnetic head are connected by soldering or ultrasonic bonding to a reproduction signal retrieving lead line 40 and a recording signal supply lead line 41. Then the magnetic head slider 100 is bonded by the resin and built in the load arm 101.

As described above, the magnetoresistive head is assembled in the load arm while the upper pads 32, 33 for shorting the upper and lower shields are shorted by the conductive resin 34. Therefore, even in the case where the static electricity is overcharged during the assembly work, the current due to the static electricity flows through the shorting circuit, thereby making it possible to prevent the electrostatic breakdown of the MR element and the dielectric breakdown between the MR element and the two shield films.

Also, the upper and lower pads 32, 33 for shorting the upper and lower shield films may be kept shorted by the conductive resin 34 during the transportation and storage of the magnetic head before transfer to the step of assembling it in the magnetic disk apparatus. In this way, the breakdown of the MR element due to the static electricity generated by the friction during transportation or the dielectric breakdown between the MR element and the two shield films can be prevented. The conductive rein 34 is removed immediately before incorporating the magnetic head unit into the apparatus.

As described above, in the magnetoresistive head according to this embodiment, during the formation of the MR element and during the formation, processing and assembling of the inductive thin-film element, the upper and lower shield films are kept shorted thereby to prevent the electrostatic breakdown of the MR element or the dielectric breakdown between the MR element and the two shield films which otherwise might be caused by the static electricity generated during the water jetting and transportation. A general configuration of the circuit maintained during these process will be described with reference to FIG. 14.

Figure 14:
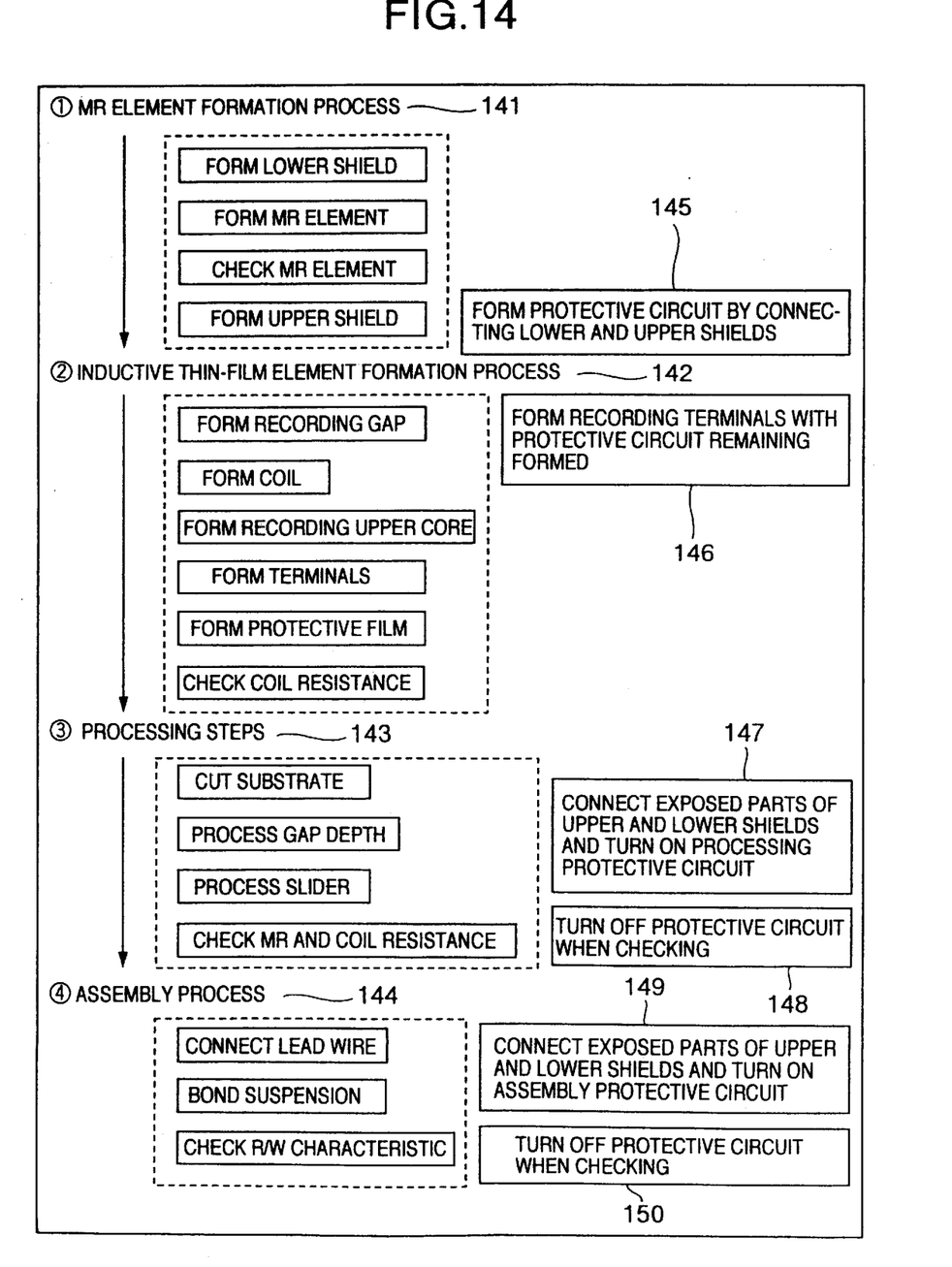
FIG. 14 is a diagram for explaining a method of fabricating a write-read separated magnetic head according to the invention.

First, the write-read separated magnetic head according to the present embodiment is fabricated as shown in FIG. 14. The fabrication process roughly comprises the step 141 for forming the MR element including the substeps of forming the lower shield to the forming of the upper shield film, the step 142 for forming the inductive thin-film element including the substeps of forming the recording gap film on the MR element to the checking of the coil resistance, the step 143 including the substeps of cutting out each slider from the substrate on which the elements are mounted to the checking of the MR and the resistance, and the assembly step 144 including the substeps of wiring the lead wire on the slider to the mounting on the suspension (load arm).

A method of fabricating the magnetoresistive head according to this embodiment comprises the step 141 of forming the MR element in which a shorting circuit is formed for shorting the upper and lower shield films (job 144) to form the MR element, the step 142 for forming the inductive thin-film element in which the element is formed with the shorting circuit formed (job 145), the step 143 in which the (processing) protection circuit (the shorting circuit including the conductive resin 34 or the pins 35) for connecting the upper and lower shield films are turned on for connecting the upper and lower shield films until the cutting of the substrate, the processing of the gap depth and the processing of the slider (job 147), and the protection circuit is turned off when the coil resistance of the MR element and the inductive thin-film element is checked (job 148), and the step 144 in which the (assembly) protection circuit for connecting the upper and lower shield films is kept turned on until the connection of the lead wire and the suspension bonding (job 149), and the read/write characteristics are checked after removing the protection circuit (shorting circuit) immediately before incorporating the magnetoresistive head unit in the magnetic disk apparatus (job 150).

In this way, in a method of fabricating the magnetoresistive head according to this embodiment, the charged static electricity is rendered to flow through a shorting circuit for shorting the upper and lower shield films of the magnetoresistive head unit in each process of fabrication, thereby preventing the electrostatic breakdown of the MR element and the dielectric breakdown between the the MR element and the two shield films.

The invention is not limited to the above-mentioned case in which a shunt film is used as a bias film of the magnetoresistive head. Instead, the bias film may be composed a permanent magnet film, a soft magnetic thin film and an antiferromagnetic thin film in layers. Further, the invention is not limited to the configuration described above with reference to the embodiments in which the shorting circuit for shorting the upper shield film and the lower shield film is configured using the connection means 17 at the forward end of the magnetic head of FIG. 2 or the bonding means 53, 54 on the terminal shown in FIGS. 5B, 5C.

The present invention can alternatively be configured in any of the following manners.

[Example 1]

An upper shield, a lower shield, a magnetic thin film having the magnetoresistive effect, a bias film for applying a bias magnetic field to the magnetic thin film, and an electrode for retrieving the magnetoresistive effect of the magnetic thin film are formed on a substrate. One side of the electrode is connected to the upper shield and the other side thereof connected to the lower shield. A part each of the upper and lower shields is exposed, so that the upper and lower shields can be connected.

[Example 2]

In the magnetoresistive head of example 1 above, the resistance value of the upper shield and the lower shield connected to the electrodes is ⅒ or less the sum of the resistance values of the magnetic thin film and the bias film for applying a bias magnetic field to the magnetic thin film.

Further, the apparatus according to the present invention can be fabricated by any of the following-described methods.

[Example 3]

A method of fabricating a write-read separated magnetic head element is provided, in which a recording inductive thin-film magnetic head element is deposited on a substrate carrying the magnetoresistive head element of examples 1 and 2. With the upper and lower shields connected to each other, the recording inductive thin-film magnetic head element is fabricated.

[Example 4]

A method of fabricating a magnetoresistive head unit and a write-read separated magnetic head is provided, in which the exposed parts of the upper and lower shield are kept exposed during the processing, assembling and storing between the processes of the write-read separated magnetic head element and the magnetoresistive head element.

As described above, the magnetoresistive head according to this invention comprises a shorting circuit for shorting two electrodes without the intermediary of a magnetoresistive element, thereby preventing the electrostatic breakdown of the magnetoresistive element which otherwise might be caused during the formation, assembling and transportation of the element.

Also, the magnetic head according to this invention comprises a shorting circuit for shorting, without the intermediary of the magnetoresistive element, the upper and lower shield films electrically connected to the electrodes. In this way, it is possible to prevent the electrostatic breakdown of the magnetoresistive element and the dielectric breakdown between the matnetoresistive element and two shield films which otherwise might occur during the formation, assembly and transportation of the element. Further, the resistance value of the shorting circuit is reduced to one tenth or less the resistance value of the magnetoresistive element. As a result, the charged static electricity flows mainly through the shorting circuit, thereby sufficiently preventing the electrostatic breakdown of the magnetoresistive element and the dielectric breakdown between the magnetoresistive element and the shields.

Further, in the method of fabricating the magnetoresistive head according to this invention, a shorting circuit is provided for shorting a pair of electrodes without the intermediary of the magnetoresistive element, and with the electrodes shorted by the shorting circuit without the intermediary of the magnetoresistive element, the magnetoresistive element is formed and the magnetic head unit is assembled. In this way, it is possible to prevent the electrostatic breakdown of the magnetoresistive element which otherwise might be caused during the formation, assembly and transportation of the element.

Furthermore, in the method of fabricating the magnetic head according to this invention, upper and lower shield films electrically connected with electrodes are shorted by a shorting circuit without the intermediary of the magnetoresistive film, thereby preventing the electrostatic breakdown of the magnetoresistive element and the dielectric breakdown between the magnetoresistive element and the shield films. In addition, the resistance of the shorting circuit is set to one tenth or less that of the magnetoresistive element. As a result, the charged static electricity flows mainly through the shorting circuit, thereby sufficiently preventing the electrostatic breakdown of the magnetoresistive element and the dielectric breakdown between the magnetoresistive element and the shied films.

In the case where the structure and the method of fabricating the magnetoresistive head according to the invention is introduced, therefore, it is possible to reduce the electrostatic breakdown of an MR element to zero percent during the formation, processing and assembly thereof, thereby making it possible to fabricate an MR head and a write-read separated magnetic head unit with high yield.

I claim:

1. A method of fabricating a magnetoresistive effect type head comprising the steps of:

(a) forming a lower shield film layer on a substrate;

(b) forming a magnetoresistive effect element having a magnetoresistive effect film and a bias film on the lower shield film through a lower gap film and two electrodes for detecting a change of a resistance caused by an external magnetic field variation of the magnetoresistive effect element;

(c) connecting one of the two electrodes to the lower shield film electrically;

(d) forming an upper shield film on the lower shield film, the magnetoresistive effect element and the two electrodes, such that the upper shield film is shorter than the lower shield film at a side of a floating surface;

(e) connecting the other of the two electrodes with the upper shield film electrically;

(f) forming a recording gap film on the upper shield film;

(g) forming a coil on the recording gap film through an insulation film;

(h) forming a recording upper core on the coil at an opposite side of the side of the floating surface through the insulator film such that the recording upper core forms a closed-loop magnetic circuit with the upper shield film;

(i) forming a protective film on the recording upper core and exposing an end portion of the lower shield film, an end portion of the upper shield film, end portions of the two electrodes and end portions of the coil on the protective film;

(j) forming a slider block by cutting the substrate forming a plurality of magnetoresistive effect type magnetic head elements formed by previously continuous steps;

(k) connecting the end portion of the lower shield film with the end portion of the upper shield film of the magnetoresistive effect type magnetic head elements on the slider block by an electrically conductive member;

(l) cutting a shorting portion of the upper shield film and lower shield film by a lapping process on the floating surface of the slider block and determining a thickness of the magnetoresistive effect film; and (m) applying a rail process to the slider block for the floating surface.

2. A method according to claim 1, wherein the electrically conductive member for connecting the end portion of the lower shield film and the end portion of the upper shield film of the magnetoresistive effect type magnetic head elements on the slider block includes an electrically conductive resin.

3. A method according to claim 1, wherein the electrically conductive member for connecting the end portion of the lower shield film and the end portion of the upper shield film of the magnetoresistive effect type magnetic head elements on the slider block includes an external short circuit.

4. A method according to claim 1, further comprising the step of:

checking the magnetoresistive effect element through the two electrodes after forming the two electrodes for detecting the change of the resistance caused by the external magnetic field variation of the magnetoresistive effect element.

5. A method according to claim 1, further comprising a step of:

after applying the rail process to the slider block for float, cutting the electrical connection between the end portion of the upper shield film and the end portion of the lower shield film on the slider block, and checking the magnetoresistive effect element through the end portions of the two electrodes.

6. A method of fabricating a magnetoresistive effect type head assembly comprising the steps of:

(a) forming a lower shield film layer on a substrate;

(b) forming a magnetoresistive effect element having a magnetoresistive effect film and a bias film on the lower shield film through a lower gap film and two electrodes for detecting a change of a resistance caused by an external magnetic field variation of the magnetoresistive effect element;

(c) connecting one of the two electrodes to the lower shield film electrically;

(d) forming an upper shield film on the lower shield film, the magnetoresistive effect element and the two electrodes, such that the upper shield film is shorter than the lower shield film at a side of a floating surface;

(e) connecting the other of the two electrodes with the upper shield film electrically;

(f) forming a recording gap film on the upper shield film;

(g) forming a coil on the recording gap film through an insulation film;

(h) forming a recording upper core on the coil at an opposite side of the side of the floating surface through the insulation film such that the recording upper core forms a closed-loop magnetic circuit with the upper shield film;

(i) forming a protective film on the recording upper core and exposing an end portion of the lower shield film, an end portion of the upper shield film, end portions of the two electrodes and end portions of the coil on the protective film;

(j) forming a slider block by cutting the substrate forming a plurality of magnetoresistive effect type magnetic head elements formed by previously continuous steps;

(k) connecting the end portion of the lower shield film with the end portion of the upper shield film of the magnetoresistive effect type magnetic head elements on the slider block by an electrically conductive member;

(l) cutting a shorting portion of the upper shield film and lower shield film by a lapping process on the floating surface of the slider block and determining a thickness of the magnetoresistive effect film;

(m) applying a rail process to the slider block for the floating surface; and (n) mounting the slider block on a suspension spring with the end portion of the lower shield film and the end portions of the upper shield film connected by the electrically conductive member.

* * * * *

UNITED STATES PATENT AND TRADEMARK OFFICE
CERTIFICATE OF CORRECTION

PATENT NO. : 5,805,390
DATED : September 8, 1998
INVENTOR(S) : Tooru Takeura

It is certified that error appears in the above-identified patent and that said Letters Patent is hereby corrected as shown below:

| Column | Line | |
|---|---|---|
| 15 | 29 | Change "insulator" to --insulation--. |

Signed and Sealed this

Seventh Day of September, 1999

Attest:

Q. TODD DICKINSON

Attesting Officer     Acting Commissioner of Patents and Trademarks